United States Patent
Murayama et al.

(10) Patent No.: US 10,193,226 B2
(45) Date of Patent: Jan. 29, 2019

(54) WIRELESS COMMUNICATION APPARATUS, WIRELESS COMMUNICATION METHOD, AND WIRELESS COMMUNICATION SYSTEM

(71) Applicant: Outstanding Technology Co., Ltd., Tokyo (JP)

(72) Inventors: Fumitaka Murayama, Tokyo (JP); Hiroki Narusawa, Tokyo (JP)

(73) Assignee: OUTSTANDING TECHNOLOGY CO., LTD., Tokyo (JP)

( * ) Notice: Subject to any disclaimer, the term of this patent is extended or adjusted under 35 U.S.C. 154(b) by 248 days.

(21) Appl. No.: 15/363,757

(22) Filed: Nov. 29, 2016

(65) Prior Publication Data

US 2017/0162940 A1    Jun. 8, 2017

(30) Foreign Application Priority Data

Dec. 7, 2015  (JP) ................. 2015-238369

(51) Int. Cl.
*H01Q 5/22* (2015.01)
*H01Q 1/22* (2006.01)
*H01Q 1/00* (2006.01)
*H04W 84/20* (2009.01)

(52) U.S. Cl.
CPC ............... *H01Q 5/22* (2015.01); *H01Q 1/007* (2013.01); *H01Q 1/2291* (2013.01); *H04W 84/20* (2013.01)

(58) Field of Classification Search
CPC ......... H01G 5/22; H01G 1/007; H01G 1/2291
See application file for complete search history.

(56) References Cited

U.S. PATENT DOCUMENTS

2014/0140703 A1    5/2014  Sako et al.

FOREIGN PATENT DOCUMENTS

JP    2014-103488 A    6/2014

*Primary Examiner* — Graham Smith
(74) *Attorney, Agent, or Firm* — Pearne & Gordon LLP

(57) ABSTRACT

A wireless communication apparatus includes a wireless communication device configured to be capable of executing wireless communication using radio waves, an optical space communication device configured to be capable of executing optical space communication using spatial light, and a communication controller that causes secure communication with another wireless communication apparatus to be executed in a data link layer by performing parallel control on the wireless communication device and the optical space communication device.

10 Claims, 4 Drawing Sheets

WIRELESS COMMUNICATION APPARATUS, WIRELESS COMMUNICATION METHOD, AND WIRELESS COMMUNICATION SYSTEM

CROSS REFERENCE TO RELATED APPLICATIONS

This application claims the benefit of Japanese Patent Application No. 2015-238369, filed Dec. 7, 2015, which is hereby incorporated by reference in its entirety.

BACKGROUND

Technical Field

The present disclosure relates to a wireless communication apparatus, a wireless communication method, and a wireless communication system, the wireless communication apparatus and system having a wireless communication device configured to be capable of executing wireless communication using radio waves, the wireless communication device being used in the wireless communication method.

Background

Wireless communication apparatuses that achieve high-speed wireless communication have recently been widely used, and such wireless communication is becoming more frequently used even in places where information confidentiality is required (for example, meeting rooms). Since radio waves are used as a carrier for wireless communication, a malicious third party may be able to intercept the radio waves from outside a meeting room. Security technology involving encryption processing or authentication processing is thus implemented in wireless communication apparatuses of this type so as to prevent analysis of the content of data from the intercepted radio waves.

However, as long as radio waves are used as a carrier in this type of wireless communication, the risk of being intercepted by a third party cannot be completely excluded. That is, even in wireless communication in which encryption processing or authentication processing is implemented, wiretapping or tampering may become possible in future as data analysis technology further improves.

The present disclosure has been made in light of the above-described problems, and the present disclosure is related to providing a wireless communication apparatus, a wireless communication method, and a wireless communication system that are capable of executing high-speed data communication while ensuring that the security level of the communication is high.

SUMMARY

According to a first aspect of the present disclosure, "a wireless communication apparatus" includes a wireless communication device configured to be capable of executing wireless communication using radio waves, an optical space communication device configured to be capable of executing optical space communication using spatial light, and a communication control unit that causes secure communication with another wireless communication apparatus to be executed in a data link layer by performing parallel control on the wireless communication device and the optical space communication device.

In this manner, since the communication control unit is provided that causes secure communication to be executed in the data link layer by performing parallel control on the wireless communication device and the optical space communication device, it becomes possible to complementarily use wireless communication having a relatively high communication speed and optical space communication for which the shielding effect is relatively high within a space. High-speed data communication can thus be executed while ensuring that the security level thereof is high.

Further, it is preferable that the communication control unit causes the secure communication to be executed by selectively using the wireless communication device or the optical space communication device in accordance with content of data received or to be transmitted. The overall quality of communication is improved by selecting the type of communication that is appropriate for the content of the data.

Further, it is preferable that the content of the data includes at least one of local-area network identification information, the type of an upper layer protocol, and the type of a logical port.

Further, it is preferable that before completion of authentication performed by the other wireless communication apparatus or an external apparatus, the communication control unit causes the secure communication to be executed in which data regarding authentication processing for the wireless communication apparatus is transmitted and received using only the optical space communication device. As a result, it becomes possible to transmit and receive the data regarding authentication processing without using wireless communication for which the shielding effect is relatively low within a space, and thus tampering, spoofing, or the like by a third party can be prevented.

Further, it is preferable that before starting the wireless communication involving encryption with the other wireless communication apparatus, the communication control unit causes the secure communication to be executed in which data regarding cryptographic-key acquisition processing is transmitted and received using only the optical space communication device. As a result, it becomes possible to transmit and receive the data regarding cryptographic-key acquisition processing without using wireless communication for which the shielding effect is relatively low within a space, and thus wiretapping, tampering, or the like by a third party can be prevented.

Further, it is preferable that the communication control unit causes the secure communication to be executed in which data is transmitted and received using the optical space communication device in a prioritized manner before a wireless communication connection with the other wireless communication apparatus is established, and using the wireless communication device in a prioritized manner after the wireless communication connection is established. High-speed and smooth communication can be achieved by transmitting and receiving substantial content data using, in a prioritized manner, wireless communication having a relatively high communication speed.

Further, it is preferable that the communication control unit causes the secure communication to be executed in which data with which it is possible to dynamically set a channel for the wireless communication and with which the currently set channel is identifiable is transmitted and received using only the optical space communication device. Dynamic changing of the channel for the wireless communication during continuation of the wireless communication connection can make it more difficult for a third party to intercept the radio waves.

Further, it is preferable that the secure communication is data communication in which at least one of encryption processing and authentication processing is implemented.

According to a second aspect of the present disclosure, "a wireless communication method" in which a wireless communication apparatus is used, the wireless communication apparatus including a wireless communication device configured to be capable of executing wireless communication using radio waves and an optical space communication device configured to be capable of executing optical space communication using spatial light, includes a step of controlling in which, using the wireless communication apparatus, secure communication with another wireless communication apparatus is executed in a data link layer by performing parallel control on the wireless communication device and the optical space communication device.

According to a third aspect of the present disclosure, "a wireless communication system" includes two or more of the wireless communication apparatuses described above. One of the two or more of the wireless communication apparatuses serves as a master device, and the other wireless communication apparatuses serve as slave devices.

According to the wireless communication apparatus, wireless communication method, and wireless communication system according to the present disclosure, high-speed data communication can be achieved while ensuring that the security level thereof is high.

DETAILED DESCRIPTION

Further features of the present disclosure will become apparent from the following detailed description of an exemplary embodiment with reference to the accompanying drawings.

Overall Configuration of Wireless Communication System 10

Figure 1:
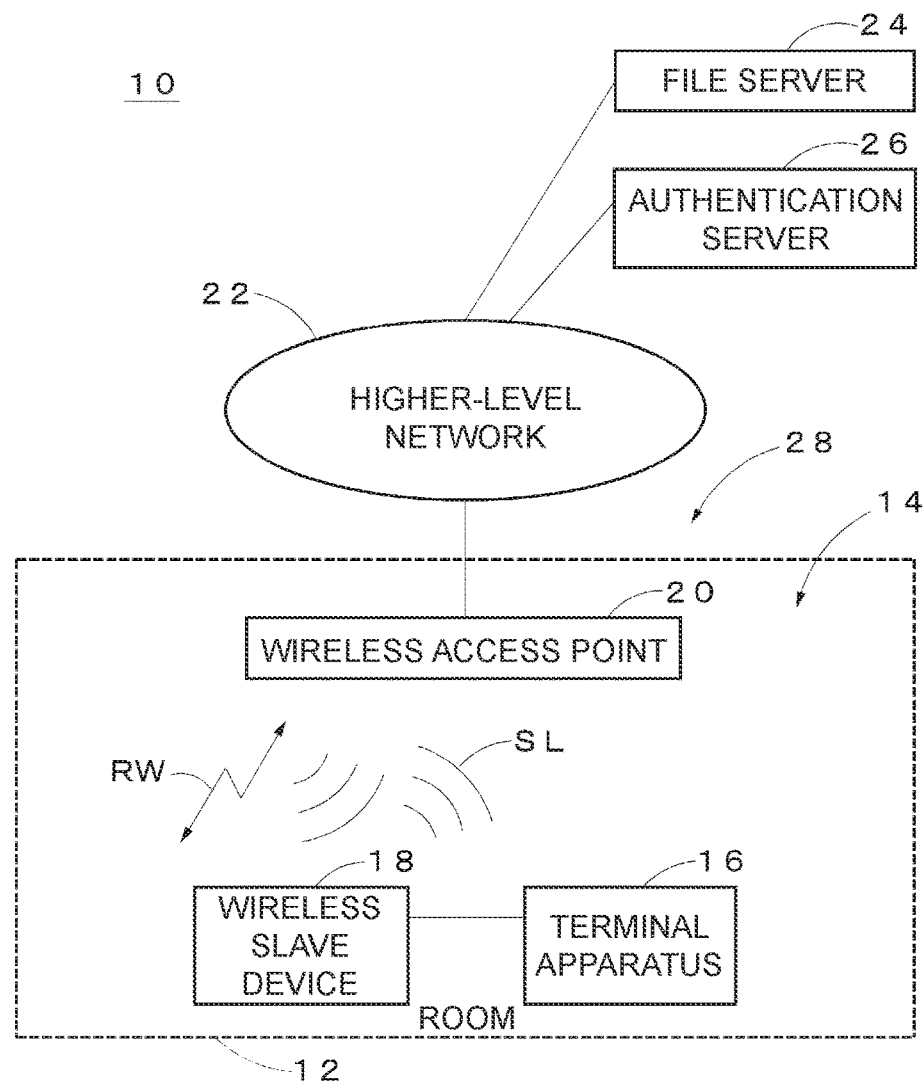
FIG. 1 is a diagram of the overall configuration of a wireless communication system according to an embodiment.

FIG. 1 is a diagram of the overall configuration of a wireless communication system 10 according to the present embodiment. A portion of the wireless communication system 10 is constructed in a room 12 of a building (for example, a meeting room in a business establishment). A terminal apparatus 16, one wireless slave device 18 (a wireless communication apparatus) externally connected to the terminal apparatus 16, and one wireless master device (hereinafter referred to as a wireless access point 20, which is a wireless communication apparatus) are installed in an internal space 14 formed by the room 12.

The terminal apparatus 16 is specifically a computer device examples of which include a laptop (notebook) personal computer (PC), a desktop PC, and a tablet computer.

The wireless slave device 18 is a communication apparatus configured to be capable of individually executing "wireless communication" using radio waves RW and "optical space communication" using spatial light SL. Here, the radio waves RW are electromagnetic waves used in wireless communication, and generally correspond to a frequency band of 10 kHz to 300 GHz. Alternatively, as in a wireless communication rule according to the International Telecommunication Convention, the radio waves RW may be defined as electromagnetic waves of 3 THz or lower.

The spatial light SL is visible light, infrared light, ultraviolet light, or light obtained by combining some or all of visible light, infrared light, and ultraviolet light. According to "Glossary of optical terms" of JIS Z 8120:2001, "visible light" is light capable of directly causing a visual sensation after entering the eyes of a person, and corresponds to a wavelength range of about 380 to 780 nm. "Infrared light" is light having a range of wavelengths longer than those of visible light, and corresponds to a wavelength range of up to about 1 mm. "Ultraviolet light" is light having a range of wavelengths shorter than those of visible light, and corresponds to a wavelength range of down to about 1 nm.

One wireless slave device 18 is shown in the room 12 in the example shown in this drawing; however, two or more of the wireless slave devices 18 may be present. In addition, the wireless slave device 18 does not have to be externally connected to the terminal apparatus 16, and may also be built in the terminal apparatus 16 in advance.

Similarly to the wireless slave device 18, the wireless access point 20 is a communication apparatus configured to be capable of individually executing wireless communication and optical space communication. In the example shown in this drawing, the wireless access point 20 is arranged so as to be fixed on the ceiling side of the room 12, and emits the radio waves RW and the spatial light SL toward the floor side of the room 12.

The wireless access point 20 is connected via a higher-level network 22 to external apparatuses including various types of server such that communication is possible. The higher-level network 22 is, for example, a local-area network (LAN) or a wide area network (WAN), and may also be connected to further higher-level networks including the Internet.

In the example shown in this drawing, a file server 24 for sharing data files and an authentication server 26 for performing user authentication (external apparatuses) are connected to the higher-level network 22. Accordingly, a user of the terminal apparatus 16 can use various types of service provided by the file server 24 and the authentication server 26 through communication performed between the wireless slave device 18 and the wireless access point 20.

A material whose shielding level for the spatial light SL is significantly high is used for the interior and walls of the room 12, and thus the spatial light SL does not leak from the interior and walls of the room 12 to an external space 28. In contrast to this, the radio waves RW may pass through the interior and walls of the room 12 and leak to the external space 28. That is, it can be said in terms of interception that the security of communication is ensured more easily in the case of optical space communication than in the case of wireless communication.

Electrical Block Diagram of Wireless Access Point 20

Figure 2:
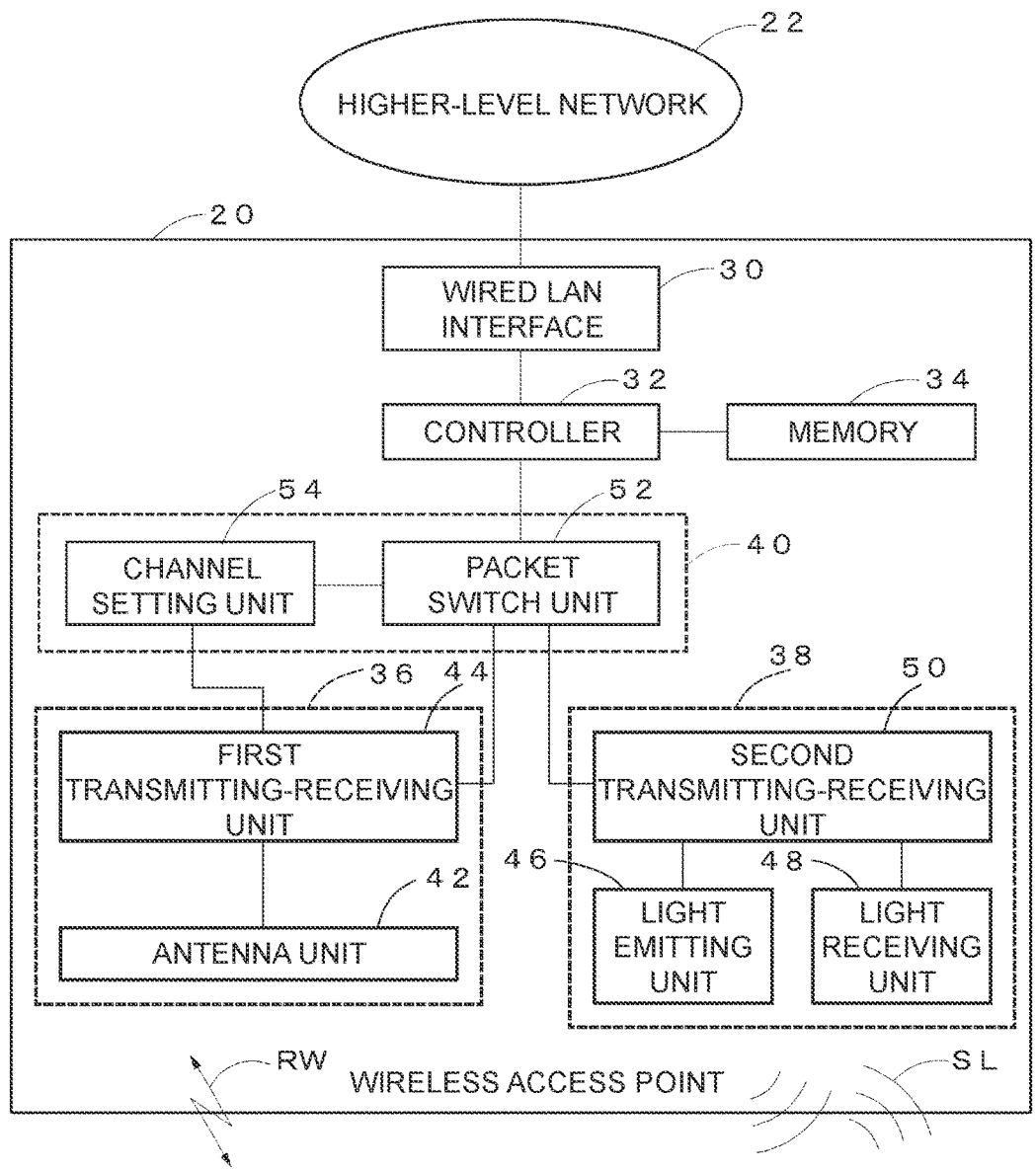
FIG. 2 is an electrical block diagram of a wireless access point shown in FIG. 1.

FIG. 2 is an electrical block diagram of the wireless access point 20 shown in FIG. 1. The wireless access point 20 includes a wired LAN interface 30, a controller 32, a memory 34, a wireless communication device 36, an optical space communication device 38, and a communication controller 40 (a communication control unit).

The wired LAN interface 30 is an interface for establishing a connection to the higher-level network 22 that is configured as a wired LAN. Another interface may be substituted for the wired LAN interface 30 in accordance with the structure of the higher-level network 22, and specifically a wireless LAN interface or a power line communication interface may be applied.

The controller 32 includes, for example, a micro-processing unit (MPU) or a central processing unit (CPU), and is a device that controls the structural elements of the wireless access point 20. The memory 34 includes, for example, a non-volatile computer readable storage medium such as a random-access memory (RAM), and stores programs, data, and the like necessary for the controller 32 to control the structural elements.

The wireless communication device 36 is a communication module supporting, for example, the standard of "short-range wireless communication" including WiFi or the standard of "near field communication" including Bluetooth® and ZIGBEE®. Specifically, the wireless communication device 36 includes an antenna unit 42 that transmits and receives the radio waves RW to and from the wireless slave device 18 (FIG. 1) and a first transmitting-receiving unit 44 that executes various types of signal processing including demodulation and modulation processing for the radio waves RW received and to be transmitted and baseband processing.

The optical space communication device 38 is a communication module using, for example, the standard of "visible light communication" including JEITA CP-1223, the standard of "infrared-ray communication" including IrDA, or the standard of its own. Specifically, the optical space communication device 38 includes a light emitting unit 46 that emits the spatial light SL toward the wireless slave device 18 (FIG. 1), a light receiving unit 48 that receives the spatial light SL from the wireless slave device 18, and a second transmitting-receiving unit 50 that executes various types of signal processing including demodulation and modulation processing for the spatial light SL received and to be transmitted.

The light emitting unit 46 includes, for example, a light emitting device examples of which include a light-emitting diode (LED) element, an organic electroluminescent (EL) element, an inorganic EL element, and a laser diode element. The light receiving unit 48 includes, for example, a photoelectric conversion element examples of which include a photodiode element, a photoconductor, and a phototransistor.

The communication controller 40 includes, for example, an electronic substrate, and controls a communication operation of the wireless communication device 36, the optical space communication device 38, or both. Specifically, the communication controller 40 includes a packet switch unit 52 that sorts packets to be transmitted and that collects packets that have already been received, and a channel setting unit 54 capable of dynamically setting a channel for wireless communication.

Electrical Block Diagram of Wireless Slave Device 18

Figure 3:
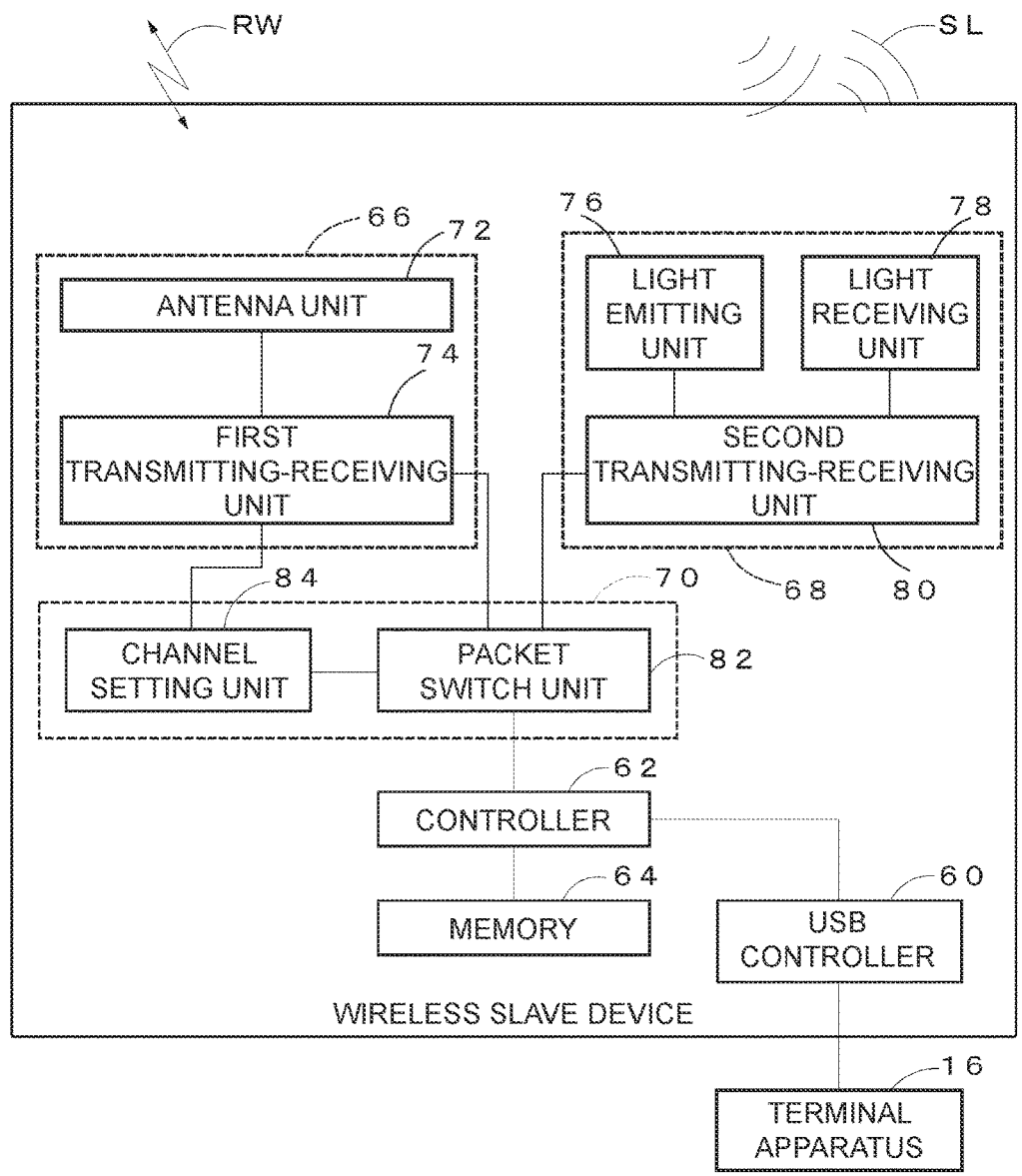
FIG. 3 is an electrical block diagram of a wireless slave device shown in FIG. 1.

FIG. 3 is an electrical block diagram of the wireless slave device 18 shown in FIG. 1. The wireless slave device 18 has a configuration the same as that of the wireless access point 20, and includes a Universal Serial Bus (USB) controller 60 instead of the wired LAN interface 30. The wireless slave device 18 includes the USB controller 60, a controller 62, a memory 64, a wireless communication device 66, an optical space communication device 68, and a communication controller 70 (a communication control unit), and realizes a function that is substantially the same as that of the wireless access point 20.

The USB controller 60 is a chip for performing USB data transfer control. Accordingly, the wireless slave device 18 is connected to the terminal apparatus 16 in a detachable manner via a USB connector, which is not shown.

The structural elements other than the USB controller 60 may be the same as or different from corresponding elements of the wireless access point 20. The wireless communication device 66 includes an antenna unit 72 and a first transmitting-receiving unit 74 in the example shown in this drawing. The optical space communication device 68 includes a light emitting unit 76, a light receiving unit 78, and a second transmitting-receiving unit 80 in the example shown in this drawing. The communication controller 70 includes a packet switch unit 82 and a channel setting unit 84 in the example shown in this drawing.

Operation of Wireless Communication System 10

Figure 4:
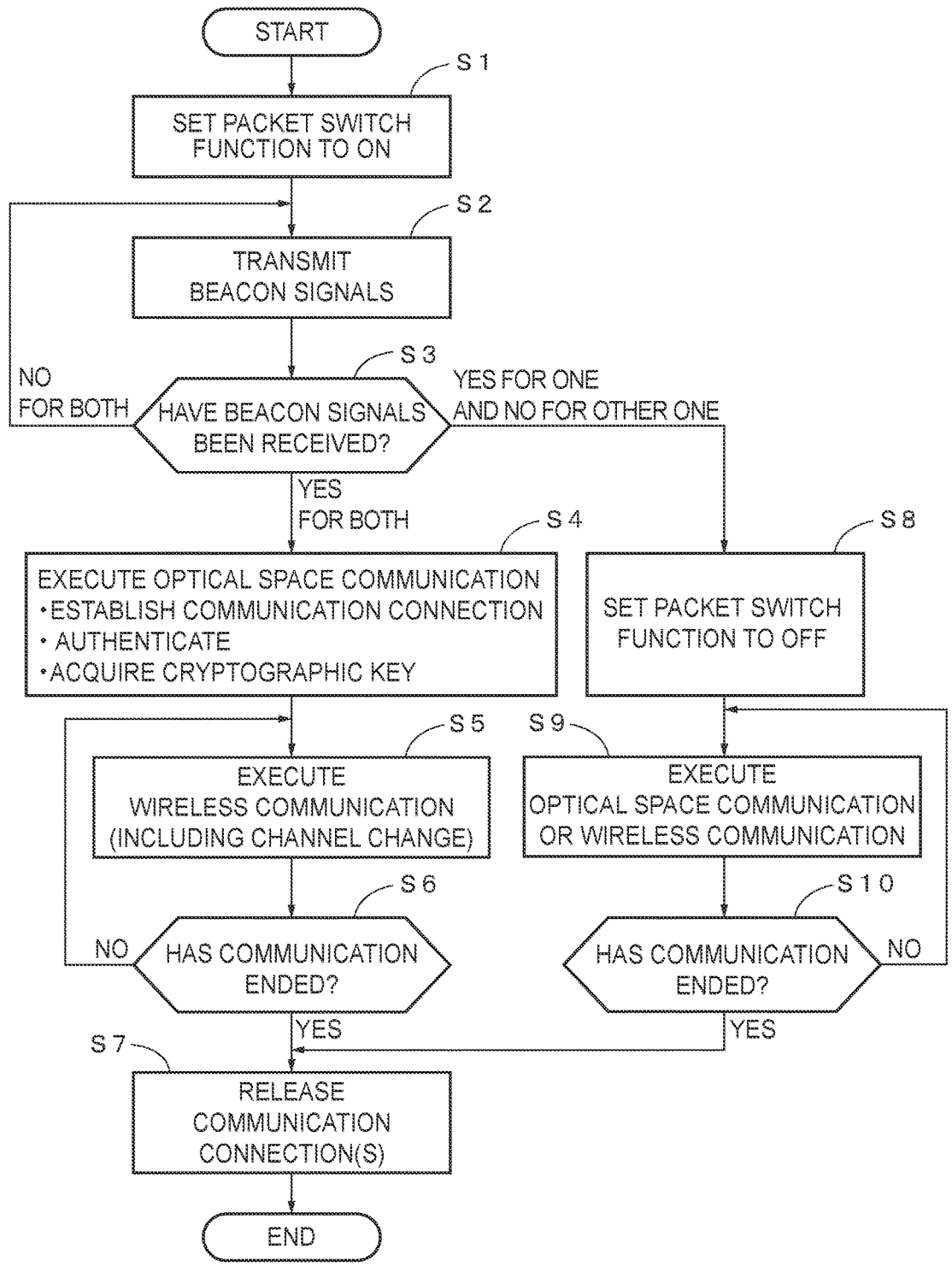
FIG. 4 is a flowchart used to describe an operation of the wireless communication system.

The wireless communication system 10 according to the present embodiment is configured as above. Next, an operation of the wireless communication system 10 will be described with reference to the flowchart of FIG. 4. Here, a description will be made taking as an example the case where secure communication is performed between the terminal apparatus 16 and the file server 24.

Here, "secure communication" refers to data communication according to a secured communication protocol on a transmission path (channel), and specifically corresponds to data communication in which at least one of "encryption processing" and "authentication processing" is implemented. In the following, a description will be made on the presence of secure communication at the level of a data link layer.

In step S1, the controller 32 of the wireless access point 20 sets a packet switch function realized by the communication controller 40 to "on". Here, note that the on-off state of the packet switch function on the side where the wireless slave device 18 is provided changes in accordance with a use state of the wireless slave device 18.

In step S2, the wireless access point 20 periodically or non-periodically transmits beacon signals for establishing communication connections. Before the transmission, the communication controller 40 commands the wireless communication device 36 and the optical space communication device 38 to simultaneously transmit the beacon signals. As a result, the first transmitting-receiving unit 44 outputs the radio waves RW through the antenna unit 42, and the second transmitting-receiving unit 50 outputs the spatial light SL through the light emitting unit 46.

In step S3, the controller 62 of the wireless slave device 18 determines whether the beacon signals transmitted simultaneously in step S2 have been received. Before this determination, the controller 62 acquires the beacon signal for which the radio waves RW are used as a carrier via the antenna unit 72, the first transmitting-receiving unit 74, and the communication controller 70. The controller 62 acquires the beacon signal for which the spatial light SL is used as a carrier via the light receiving unit 78, the second transmitting-receiving unit 80, and the communication controller 70.

In the case where it is determined that neither the wireless communication device 66 nor the optical space communication device 68 has performed reception (step S3: NO for both), the process returns to step S2, and steps S2 and S3 are successively repeated until at least one of the beacon signals is received.

In the case where it is determined that both the wireless communication device 66 and the optical space communication device 68 have performed reception (step S3: YES for both), the process proceeds to the next step (S4). In this case, the wireless slave device 18 sends a response indicating that the beacon signals have been received, by outputting the radio waves RW and the spatial light SL toward the wireless access point 20. Note that the communication controller 40 (70) thereafter performs parallel control on the wireless communication device 36 (66) and the optical space communication device 38 (68) in order to achieve secure communication.

In step S4, the wireless slave device 18 and the wireless access point 20 execute processing for establishing communication connections (so-called connections) therebetween. Here, the controllers 32 and 62 each recognize that a transmission path for optical space communication is available, and maintain the setting of the packet switch function realized by the communication controllers 40 and 70 at "on".

The packet switch unit 52 (82) analyzes the content of data generated by the controller 32 (62), and outputs the data on a packet-by-packet basis to either of the first transmitting-receiving unit 44 (74) and the second transmitting-receiving unit 50 (80). For example, when the packet switch unit 52 (82) outputs data regarding authentication processing before authentication processing for the wireless slave device 18 is completed, the packet switch unit 52 (82) outputs the data only to the second transmitting-receiving unit 50 (80).

Here, an authentication method may be a method including the Wi-Fi Protected Access Pre-Shared Key (WPA-PSK) and performed by the wireless access point 20 itself, or may also be a method including the Wi-Fi Protected Access Extensible Authentication Protocol (WPA-EAP) and performed by another external apparatus (for example, the authentication server 26). The data regarding authentication processing includes, for example, ID information, a password, a digital certificate, and virtual LAN (VLAN) identification information.

In addition, when the packet switch unit 52 (82) outputs data regarding cryptographic-key acquisition processing before wireless communication involving encryption is performed with the wireless slave device 18 (the wireless access point 20), the packet switch unit 52 (82) outputs the data only to the second transmitting-receiving unit 50 (80). This acquisition processing is either [1] "exchange processing" in which a cryptographic key is directly acquired through exchange or [2] "generation processing" in which a cryptographic key is generated on the basis of an acquired seed.

Various methods applicable to wireless LAN communication including the Wired Equivalent Privacy (WEP), the Pre-Shared Key (PSK), the Temporal Key Integrity Protocol (TKIP), the Advanced Encryption Standard (AES), and the Counter-mode CBC-MAC Protocol (CCMP) may each be used as an encryption method.

In this manner, the wireless slave device 18 and the wireless access point 20 execute processing for establishing a communication connection using only optical space communication for which the spatial light SL is used as a carrier (step S4). After completion of this processing, one transmission path for wireless communication and one transmission path for optical space communication are established substantially simultaneously. Hereinafter a communication connection through the former transmission path is referred to as "wireless communication connection", and a communication connection through the latter transmission path is referred to as "optical space communication connection".

In step S5, the terminal apparatus 16 becomes capable of executing, as necessary, data communication to and from external apparatuses including the file server 24 through the wireless communication connection established in step S4. The wireless access point 20 executes, using only wireless communication for which the radio waves RW are used as a carrier, data communication to and from the wireless slave device 18 in communication phases other than the phase of step S4 (hereinafter referred to as a connection phase). Likewise, the wireless slave device 18 executes, using only wireless communication, data communication to and from the wireless access point 20 in the communication phases other than the connection phase.

Note that optical space communication or wireless communication is selectively used after the time when the wireless communication connection is established in the above example; however, the way in which either optical space communication or wireless communication is selected and used is not limited to this use method. For example, optical space communication may be used in a prioritized manner before the wireless communication connection is established, and wireless communication may be used in a prioritized manner after the wireless communication connection is established. This "used in a prioritized manner" includes cases: [1] the above selective use, [2] use of the target communication such that a use time, a use frequency, or a data communication volume of the target communication occupies more than half of the total use time, total use frequency, or total data communication volume, and [3] use of the target communication in normal cases and use of the other communication in exceptional cases when a specific communication condition regarding communication processing is satisfied.

In step S6, the wireless access point 20 determines whether the secure communication with the wireless slave device 18 has ended. In the case where it is determined that the secure communication with the wireless slave device 18 has not yet ended (step S6: NO), the process returns to step S5, and steps S5 and S6 are successively repeated until the secure communication ends.

The channel setting unit 54 starts up a random timer; changes, after a random time has passed, the frequency of the radio waves RW that the first transmitting-receiving unit 44 uses; and notifies the packet switch unit 52 of the change. The packet switch unit 52 outputs, only to the second transmitting-receiving unit 50, a channel change request including data (frequency information after the change) with which channel identification is possible.

The packet switch unit 82 of the wireless slave device 18 acquires the channel change request output from the light emitting unit 46 via the light receiving unit 78 and the second transmitting-receiving unit 80. The channel setting unit 84 analyzes the channel change request output from the packet switch unit 82, and changes the frequency of the radio waves RW that the first transmitting-receiving unit 74 uses.

In this manner, wireless communication is normally used during continuation of a wireless communication connection, and optical space communication is used in exceptional cases when the channel for wireless communication is dynamically changed. As a result, this can make it more difficult for a third party to intercept the radio waves RW. In contrast, in the case where it is determined that the secure communication has ended (step S6: YES), the process proceeds to the next step (S7).

In step S7, the wireless slave device 18 and the wireless access point 20 release the communication connections established therebetween. That is, the two transmission paths for wireless communication and optical space communication are released substantially simultaneously.

Returning to step S3, in the case where it is determined that reception from the wireless communication device 66 has been performed and reception from the optical space communication device 68 has not been performed (step S3: YES for one and NO for the other one), the process proceeds to another step (S8). In this case, the wireless slave device 18 sends a response indicating that the beacon signal has been received, by outputting the radio waves RW toward the wireless access point 20.

In step S8, the controller 32 of the wireless access point 20 recognizes that no transmission path for optical space communication is available, and sets the packet switch function realized by the communication controller 40 to "off". As a result, only wireless communication is executed between the wireless slave device 18 and the wireless access point 20.

After the wireless slave device 18 and the wireless access point 20 have established a wireless communication connection therebetween, the terminal apparatus 16 becomes capable of executing, as necessary, data communication to and from the external apparatuses including the file server 24 (step S9).

Thereafter, the wireless access point 20 determines whether the secure communication with the wireless slave device 18 has ended (step S10). In the case where it is determined that the secure communication with the wireless slave device 18 has not yet ended (step S10: NO), the process returns to step S9, and steps S9 and S10 are successively repeated until the secure communication ends. In contrast, in the case where it is determined that the secure communication has ended (step S10: YES), the wireless slave device 18 and the wireless access point 20 release the wireless communication connection established therebetween (step S7).

Returning to step S3, in the case where, in contrast to the above case, it is determined that reception from the wireless communication device 66 has not been performed and reception from the optical space communication device 68 has been performed (step S3: YES for one and NO for the other one), the process proceeds likewise to step S8.

In step S8, the controller 32 of the wireless access point 20 recognizes that no transmission path for wireless communication is available, and sets the packet switch function realized by the communication controller 40 to "off". As a result, only optical space communication is executed between the wireless slave device 18 and the wireless access point 20.

After the wireless slave device 18 and the wireless access point 20 have established an optical space communication connection therebetween, secure communication is executed between the terminal apparatus 16 and the file server 24 (step S9). Thereafter, the wireless access point 20 determines whether the secure communication has ended (step S10). In the case where it is determined that the secure communication has not yet ended (step S10: NO), the process returns to step S9, and steps S9 and S10 are successively repeated until the secure communication ends.

In contrast, in the case where it is determined that the secure communication has ended (step S10: YES), the wireless slave device 18 and the wireless access point 20 release the optical space communication connection established therebetween (step S7).

In this manner, the terminal apparatus 16 ends the secure communication with the file server 24 via the wireless slave device 18 and the wireless access point 20.

Another Communication Operation Example

In step S5 described above, the communication operation using only wireless communication is executed in the communication phases other than the connection phase; however, optical space communication may be used in exceptional cases in accordance with the content of data. In this case, the packet switch unit 52 (82) analyzes the content of data generated by the controller 32 (62), and outputs the data on a packet-by-packet basis to either of the first transmitting-receiving unit 44 (74) and the second transmitting-receiving unit 50 (80).

The data to be analyzed includes, for example, at least one of local-area network identification information, the type of an upper layer protocol, and the type of a logical port. In this case, the packet switch unit 52 (82) outputs the data in units of packets to the second transmitting-receiving unit 50 (80) in case [1] where a specific network layer protocol (for example, the Address Resolution Protocol (ARP)) is used, in case [2] where a Transmission Control Protocol (TCP) port number of a transmission source or a transmission destination takes a specific value, and in case [3] where ID information of a VLAN tag takes a specific value.

In addition, the packet switch unit 52 (82) may output the data in units of packets to the second transmitting-receiving unit 50 (80) in a case where [4] setting information for setting user restrictions regarding reading, editing, and the like or [5] text information indicating the confidentiality of a document is detected.

Advantageous Effects of Present Embodiment

As described above, the wireless access point 20 includes the wireless communication device 36 configured to be capable of executing wireless communication using the radio waves RW, the optical space communication device 38 configured to be capable of executing optical space communication using the spatial light SL, and the communication controller 40 that causes secure communication with another wireless communication apparatus (the wireless slave device 18) to be executed in a data link layer by performing parallel control on the wireless communication device 36 and the optical space communication device 38. A wireless communication method in which the wireless access point 20 is used includes a step of controlling (S4, S5) in which, using the wireless access point 20, secure communication with the wireless slave device 18 is executed by performing parallel control on the wireless communication device 36 and the optical space communication device 38.

The wireless slave device 18 includes the wireless communication device 66 configured to be capable of executing wireless communication using the radio waves RW, the optical space communication device 68 configured to be capable of executing optical space communication using the spatial light SL, and the communication controller 70 that causes secure communication with another wireless communication apparatus (the wireless access point 20) to be executed in the data link layer by performing parallel control on the wireless communication device 66 and the optical space communication device 68. A wireless communication method in which the wireless slave device 18 is used includes a step of controlling (S4, S5) in which, using the wireless slave device 18, secure communication with the wireless access point 20 is executed by performing parallel control on the wireless communication device 66 and the optical space communication device 68.

The wireless communication system 10 includes two or more wireless communication apparatuses, and one (the wireless access point 20) of the two or more wireless communication apparatuses serves as a master device, and the other wireless communication apparatuses (the wireless slave device 18) serve as slave devices.

Such a configuration makes it possible to complementarily use wireless communication having a relatively high communication speed and optical space communication for which the shielding effect is relatively high inside the internal space 14, and thus high-speed data communication can be achieved while ensuring that the security level thereof is high.

In addition, the communication controller 40 (70) may cause the secure communication to be executed by selectively using the wireless communication device 36 (66) or the optical space communication device 38 (68) in accordance with the content of data received or to be transmitted. The overall quality of communication is improved by selecting the type of communication that is appropriate for the content of the data.

In addition, before completion of authentication performed by the wireless access point 20 or the authentication server 26, the communication controller 40 (70) may cause the secure communication to be executed in which data regarding authentication processing for the wireless slave device 18 is transmitted and received using only the optical space communication device 38 (68). As a result, it becomes possible to transmit and receive the data regarding authentication processing without using wireless communication for which the shielding effect is relatively low inside the internal space 14, and thus tampering, spoofing, or the like by a third party can be prevented.

In addition, before starting wireless communication involving encryption with the wireless slave device 18 (the wireless access point 20), the communication controller 40 (70) may cause the secure communication to be executed in which data regarding cryptographic-key acquisition processing is transmitted and received using only the optical space communication device 38 (68). As a result, it becomes possible to transmit and receive the data regarding cryptographic-key acquisition processing without using wireless communication for which the shielding effect is relatively low inside the internal space 14, and thus wiretapping, tampering, or the like by a third party can be prevented.

In addition, the communication controller 40 (70) may cause the secure communication to be executed in which data is transmitted and received using the optical space communication device 38 (68) in a prioritized manner before a wireless communication connection with the wireless slave device 18 (the wireless access point 20) is established, and using the wireless communication device 36 (66) in a prioritized manner after the wireless communication connection is established. High-speed and smooth communication can be achieved by transmitting and receiving substantial content data using, in a prioritized manner, wireless communication having a relatively high communication speed.

In addition, the communication controller 40 (70) may cause the secure communication to be executed in which data with which it is possible to dynamically set a channel for wireless communication and with which the currently set channel is identifiable is transmitted and received using only the optical space communication device 38 (68). Dynamic changing of the channel for wireless communication during continuation of a wireless communication connection can make it more difficult for a third party to intercept the radio waves RW.

Remarks

Note that the present disclosure is not limited to the above embodiment, and can be as a matter of course freely changed without departing from the gist of the present disclosure.

For example, in the case where visible light is used as the spatial light SL, a visible-light source for lighting in the room 12 may be configured to serve also as the light emitting unit 46. In addition, the wireless communication device 36 (66) and the optical space communication device 38 (68) may also be provided as separate devices such that the wireless communication device 36 (66) and the optical space communication device 38 (68) are separable from each other.

What is claimed is:

1. A wireless communication apparatus comprising:
   a wireless communication device configured to be capable of executing wireless communication using radio waves;
   an optical space communication device configured to be capable of executing optical space communication using spatial light; and
   a communication control unit that causes secure communication with another wireless communication apparatus to be executed in a data link layer by performing parallel control on the wireless communication device and the optical space communication device.

2. The wireless communication apparatus according to claim 1, wherein the communication control unit causes the secure communication to be executed by selectively using the wireless communication device or the optical space communication device in accordance with content of data received or to be transmitted.

3. The wireless communication apparatus according to claim 2, wherein the content of the data includes at least one of local-area network identification information, the type of an upper layer protocol, and the type of a logical port.

4. The wireless communication apparatus according to claim 1, wherein before completion of authentication performed by the other wireless communication apparatus or an external apparatus, the communication control unit causes the secure communication to be executed in which data regarding authentication processing for the wireless communication apparatus is transmitted and received using only the optical space communication device.

5. The wireless communication apparatus according to claim 1, wherein before starting the wireless communication involving encryption with the other wireless communication apparatus, the communication control unit causes the secure communication to be executed in which data regarding cryptographic-key acquisition processing is transmitted and received using only the optical space communication device.

6. The wireless communication apparatus according to claim 1, wherein the communication control unit causes the secure communication to be executed in which data is transmitted and received using the optical space communication device in a prioritized manner before a wireless communication connection with the other wireless communication apparatus is established, and using the wireless communication device in a prioritized manner after the wireless communication connection is established.

7. The wireless communication apparatus according to claim 1, wherein the communication control unit causes the secure communication to be executed in which data with which it is possible to dynamically set a channel for the wireless communication and with which the currently set channel is identifiable is transmitted and received using only the optical space communication device.

8. The wireless communication apparatus according to claim 1, wherein the secure communication is data communication in which at least one of encryption processing and authentication processing is implemented.

9. A wireless communication method in which a wireless communication apparatus is used, the wireless communication apparatus including a wireless communication device configured to be capable of executing wireless communication using radio waves and an optical space communication device configured to be capable of executing optical space communication using spatial light, the wireless communication method comprising:
- a step of controlling in which, using the wireless communication apparatus, secure communication with another wireless communication apparatus is executed in a data link layer by performing parallel control on the wireless communication device and the optical space communication device.

10. A wireless communication system comprising:
two or more of the wireless communication apparatuses according to claim 1,
wherein one of the two or more of the wireless communication apparatuses serves as a master device, and the other wireless communication apparatuses serve as slave devices.

* * * * *